Patented Sept. 2, 1947

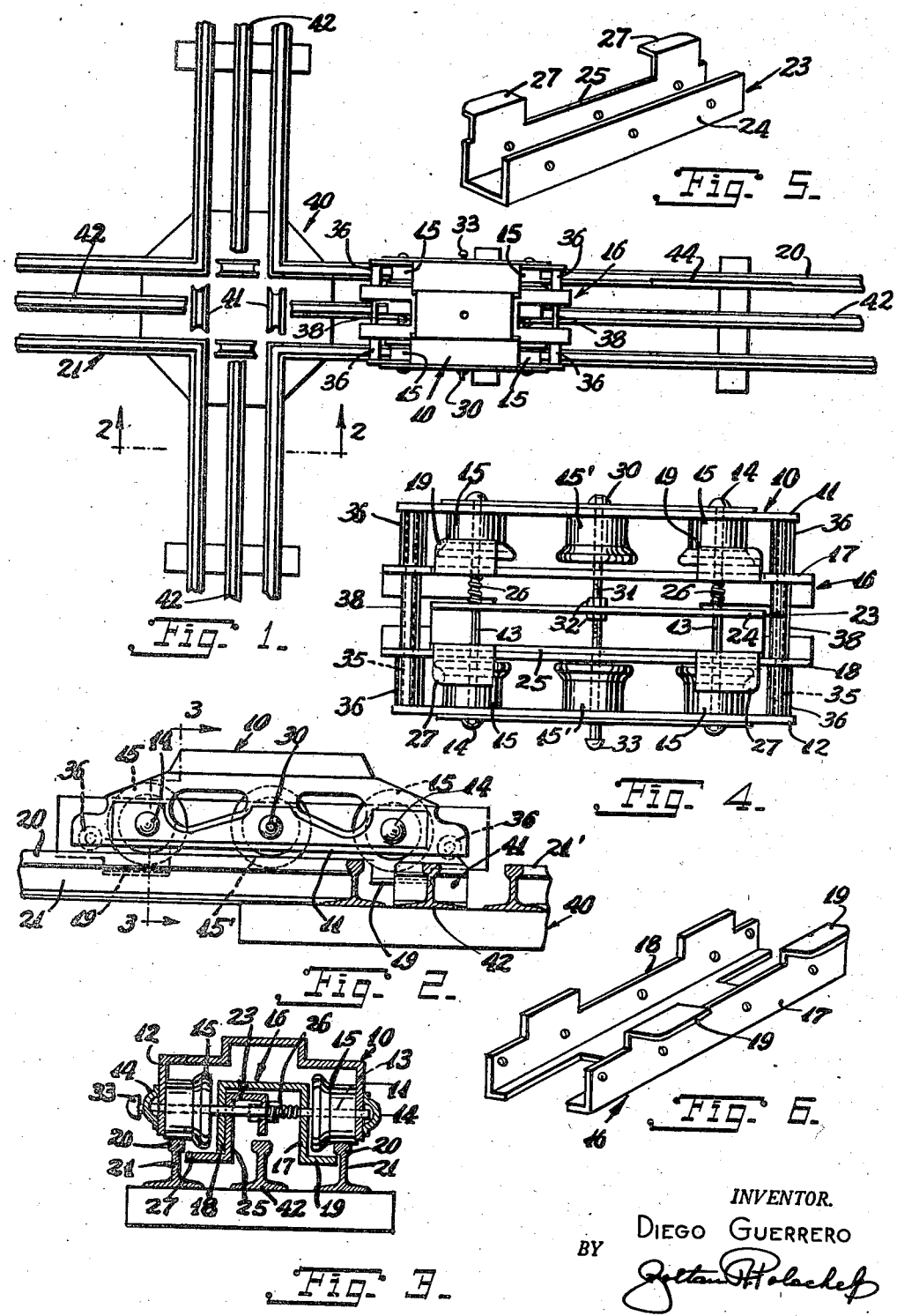

2,426,868

UNITED STATES PATENT OFFICE 2,426,868

RAILROAD SAFETY DEVICE

Diego Guerrero, Brooklyn, N. Y.

Original application May 8, 1943, Serial No. 486,128, now Patent No. 2,364,785, dated December 12, 1944. Divided and this application October 3, 1944, Serial No. 556,941

3 Claims. (Cl. 105—196)

This invention relates to new and useful improvements in railroad safety devices, and has more particular reference to improvements on my U. S. Patents No. 2,254,607 and No. 2,273,705. This is a division of my original application filed on May 8, 1943, Serial Number 486,128 and which is now known as U. S. Patent No. 2,364,785, issued December 12, 1944.

More specifically, the invention proposes an improved toy or miniature railroad truck characterized by a certain channel shaped body and members related in a certain way to each other. It is proposed that the arms of these channel shaped body and members be directed downwards and that axles be mounted across the arms and support the wheels of the truck. It is proposed that certain of these arms be provided with fins located directly beneath the axles for engaging beneath the heads of the rails at points directly beneath the wheels.

More specifically, the invention contemplates an arrangement by which one of the channel shaped members is resiliently held in position and movable so that one set of the fins are retractable to disengage from the rails. This permits the truck to be lifted off and replaced on the rails.

The invention furthermore, contemplates the provision of auxiliary axles and small wheels mounted in a certain way on said truck for supporting the truck when it engages over a rail crossing to prevent the wheels from falling in between the end section of the rails.

I am aware of a patent to Ezra Stiles for a car truck issued on April 14, 1868, and bearing the Patent No. 76,842. This reference illustrates small flanged wheels provided to the front and rear of the regular wheels and which the patentee describes as being three times broader than the regular wheels and are normally out of contact with the rails. These small wheels as described by the patentee are normally out of an operative position and are provided to be used as auxiliary wheels in the event the adjacent flanged wheels become broken or otherwise inoperative.

This construction is in sharp contrast with my construction wherein the small wheels are equal in breadth to the regular wheels and are continuously in contact with the rails and designed primarily for supporting the truck when passing over my newly designed crossing construction to prevent the flanged wheels from dropping into the open spaces of this crossing.

It is a further object of this invention to construct a railroad safety device for use on railroad car trucks which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a railroad truck constructed in accordance with this invention and shown applied to rails.

Fig. 2 is a fragmentary sectional veiw taken on the line 2—2 of Fig. 1 but illustrated with the truck shifted to the left passing the crossing.

Fig. 3 is a transverse sectional view taken on the line 3—3 of Fig. 2.

Fig. 4 is a bottom view of the truck.

Fig. 5 is a perspective view of one of the channel shaped members.

Fig. 6 is a perspective view of another one of the channel shaped members.

The improved raliroad truck, in accordance with this invention, includes a longitudinally extending channel shaped body 10 having a front arm 11 and a back arm 12, these arms being directed downwards. Several axles 13 and 30 are mounted between the arms 11 and 12. These arms are formed with small openings through which the ends of the axle pass. Small cover strips 14 are mounted on the outer faces of the arms 11 and 12 and engage over and cover the ends of the axles 13. Flanged wheels 15 are mounted on the end portions of the said axles 13 and 30 and are located adjacent the inside faces of the said arms 11 and 12.

A longitudinally extending channel shaped member 16 is disposed within said channel shaped body 10 and has a front arm 17 and a rear arm 18, these arms being directed downwards. These arms 17 and 18 moreover are located adjacent the inner faces of the said flanged wheels 15. Said arms 17 and 18 are formed with openings through which the axles 13 and 30 pass. Consequently, the channel shaped member 16 is supported by the said axles 13 and 30.

Fins 19 continue from the bottom edge of one of said arms, more specifically, the arm 17 and extend laterally in one direction and engage beneath the head 20 of one of the rails 21 for the truck. These fins 19 are located directly beneath the axles 13 and consequently directly beneath the wheels 15.

A second longitudinally extending channel shaped member 23 is disposed within the channel shaped member 16 and has a downwardly directed front arm 24 and a downwardly directed rear arm 25. These arms 24 and 25 are formed with openings through which the axles 13 pass. The channel shaped member 23 is materially narrower than the channel shaped member 16, and consequently the channel shaped member 23 is slidable on the axles 13. Resilient means in the nature of springs 26 are mounted on the axles 13 and act between the arm 17 of the channel shaped member 16 and the arm 24 of the channel shaped member 23 for urging the channel shaped member 23 towards and against the arm 18 of the channel shaped member 16. Fins 27 continue from the arm 25 of the channel shaped member 23 and extend laterally in the other direction to the direction of said fins 19. These fins 27 engage beneath the heads 20 of the rails 21 for the truck. The fins 27 are located at points directly beneath the axles 13 and therefore directly beneath the wheels 15.

An auxiliary central axle 30 is mounted on and through the several mentioned arms of the channel shaped body 10 and the channel shaped members 16 and 23. This axle 30 has a central part formed with threads 31. Nuts 32 threadedly engage these threads 31 and are located on opposite sides of the arm 24 and serve to fixedly connect the axle 30 with the channel shaped member 23. One end of the axle 30 is provided with a head 33 by which the axle may be laterally moved for correspondingly moving the channel shaped member 23. Wheels 15' are mounted upon the central axle 30 at points between the arms of the channel shaped body 10 and the channel shaped member 16, as clearly shown for example in Fig. 4.

Auxiliary end axles 35 are mounted through the arms 17 and 18 of the channel shaped member 16. Small wheels 36 are mounted on the end portions of the axles 35 and are disposed between the arms of the channel shaped body 10 and the arms of the channel shaped member 16. Spacer tubes 38 are mounted on the axles 35 between the arms 17 and 18 of the channel shaped member.

The improved truck, in accordance with this invention, may be readily mounted upon and removed from the rail system 21'. In Figs. 1 to 3 the truck is shown mounted on the rails. To remove the truck it is merely necessary that the head 33 be pushed inwards to laterally move the central axle 30. This indirectly causes the channel shaped member 23 to be moved laterally so that the fins 27 disengage from beneath the heads 20 of one of the rails 21. The truck may now be lifted upwards off the track.

The track system 21' is illustrated with a crossing 40, of a special design for use in connection with my truck, in which there are small rail sections 41. Fig. 2 illustrates the way in which the small wheels 36 support the truck while the flanged wheels 15 ride over the end portions of the small rail sections 41. Without the small wheels 36 the flanged wheels 15 would fall down in between the spaces between the rail sections. But this does not occur because at these particular instances, the truck is being supported by the small wheels 36 riding on the rail sections.

A very important feature of the invention resides in the fact that the fins 19 and 27 are located directly beneath the flanged wheels 15. Consequently, the truck is free to go around curves without interference. All curves which are capable of being negotiated by the wheels 15 will be correspondingly negotiated by the fins 19 or 27.

In the event that the track system 21' has a third rail, such as rail 42 for supplying electric current, it is advisable that the channel shaped member 23 be constructed of insulation material so that there is no likelihood of a short circuit.

The truck may be swively and removably mounted on a railroad car in any of the normal ways. If desired, the truck may be rigidly mounted on the locomotive of a train.

On toy locomotives there is but a limited space, therefore the fins 19 and 27, and the wheel member 36 are rigidly secured to the motor frame. An auxiliary method has been disclosed by which the locomotive may be removed or placed on the rail system 21'. This auxiliary method consists in forming one of the rails 21 with its head 20 provided with a cutout 44. This cutout 44 is of sufficient length so as to allow the fins 27 to pass downwards beneath the head 20 of the rail, or upwards when the truck is removed from the rails. When the truck is moved away from this point the fins 27 will ride beneath the heads 20 of the rails.

While I have illustrated and described the preferred emodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A railroad truck having a motor frame and downwardly directed spaced arms rotatively supporting flanged wheels adapted to roll on tracks and across a railroad crossing having spaced track portions forming openings into which said flanged wheels could drop, means on the ends of said truck for engaging the track on the opposite side of the openings of a crossing for maintaining the trucks horizontal and preventing the flanged wheels from dropping into the openings, comprising end axles extended between the ends of said arms on an axis fixed against vertical movement, small wheels rigidly connected to the motor frame on said axles of a width equal to the width of said flanged wheels and of a diameter to continuously roll on said tracks before and after said flanged wheels.

2. A railroad truck having a motor frame and downwardly directed spaced arms rotatively supporting flanged wheels adapted to roll on tracks and across a railroad crossing having spaced track portions forming openings into which said flanged wheels could drop, means on the ends of said truck for engaging the track on the opposite side of the openings of a crossing for maintaining the truck horizontal and preventing the flanged wheels from dropping into the openings, comprising end axles extended between the ends of said arms on an axis fixed against vertical movement, small wheels rigidly connected to the motor frame on said axles of a width equal to the width of said flanged wheels and of a diameter to continuously roll on said tracks before and after said flanged wheels, and means for retaining the small wheels against lateral movement on said end axles retaining the small wheels in position to roll on said tracks.

3. A railroad truck having a motor frame and downwardly directed spaced arms rotatively supported flanged wheels adapted to roll on tracks and across a railroad crossing having spaced track portions forming openings into which said flanged wheels could drop, means on the ends of said truck for engaging the track on the opposite side of the openings of a crossing for maintaining the truck horizontal and preventing the flanged wheels from dropping into the openings, comprising end axles extended between the ends of said arms on an axis fixed against vertical movement, small wheels rigidly connected to the motor frame on said axles of a width equal to the width of said flanged wheels and of a diameter to continuously roll on said tracks before and after said flanged wheels, and means for retaining the small wheels against lateral movement on said end axles retaining the small wheels in position to roll on said tracks, comprising spacer tubes on said end axles between the adjacent faces of said small wheels.

DIEGO GUERRERO.

REFERENCES CITED

The following references are of record in the file of this patent:

UNITED STATES PATENTS

| Number | Name | Date |
|---|---|---|
| 76,842 | Stiles | Apr. 14, 1868 |
| 2,364,785 | Guerrero | Dec. 12, 1944 |
| 309,266 | Washburn | Dec. 16, 1884 |
| 1,391,223 | Votaw | Sept. 20, 1921 |